May 9, 1939.　　A. C. VAN HOOYDONK　　2,157,780
MEAT CUTTING MACHINE
Filed Sept. 11, 1937　　3 Sheets-Sheet 1
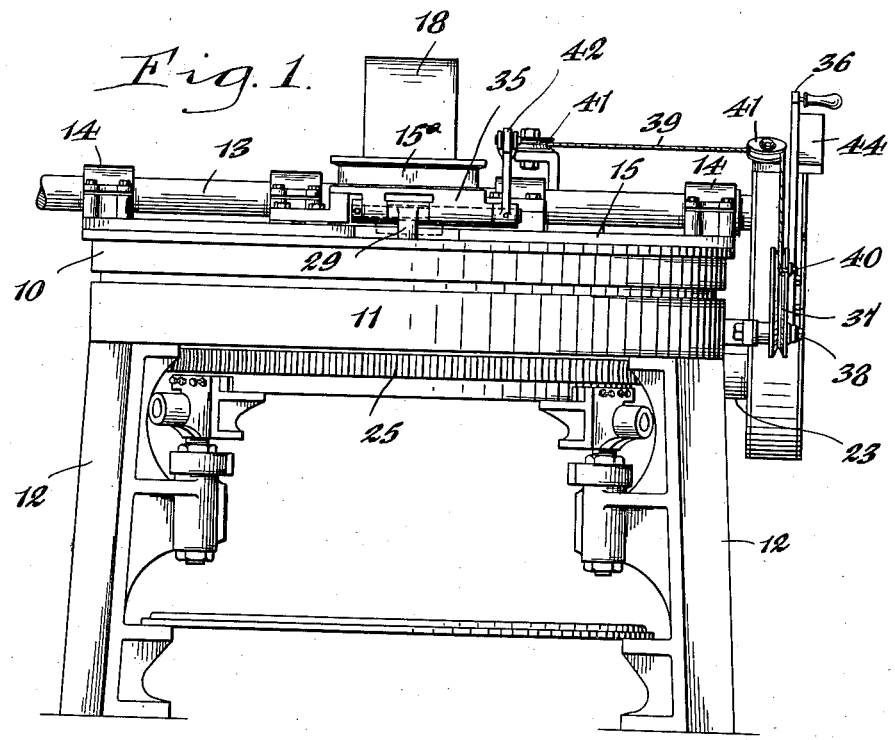
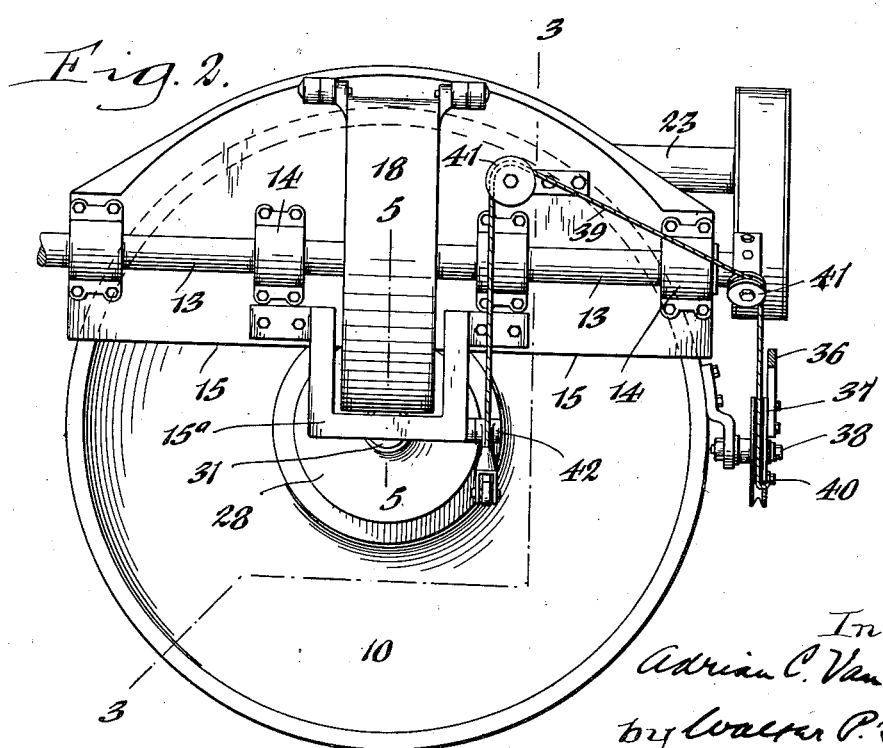
Inventor,
Adrian C. Van Hooydonk,
by Walter P. Geyer
Attorney.

May 9, 1939. A. C. VAN HOOYDONK 2,157,780
MEAT CUTTING MACHINE
Filed Sept. 11, 1937 3 Sheets-Sheet 2
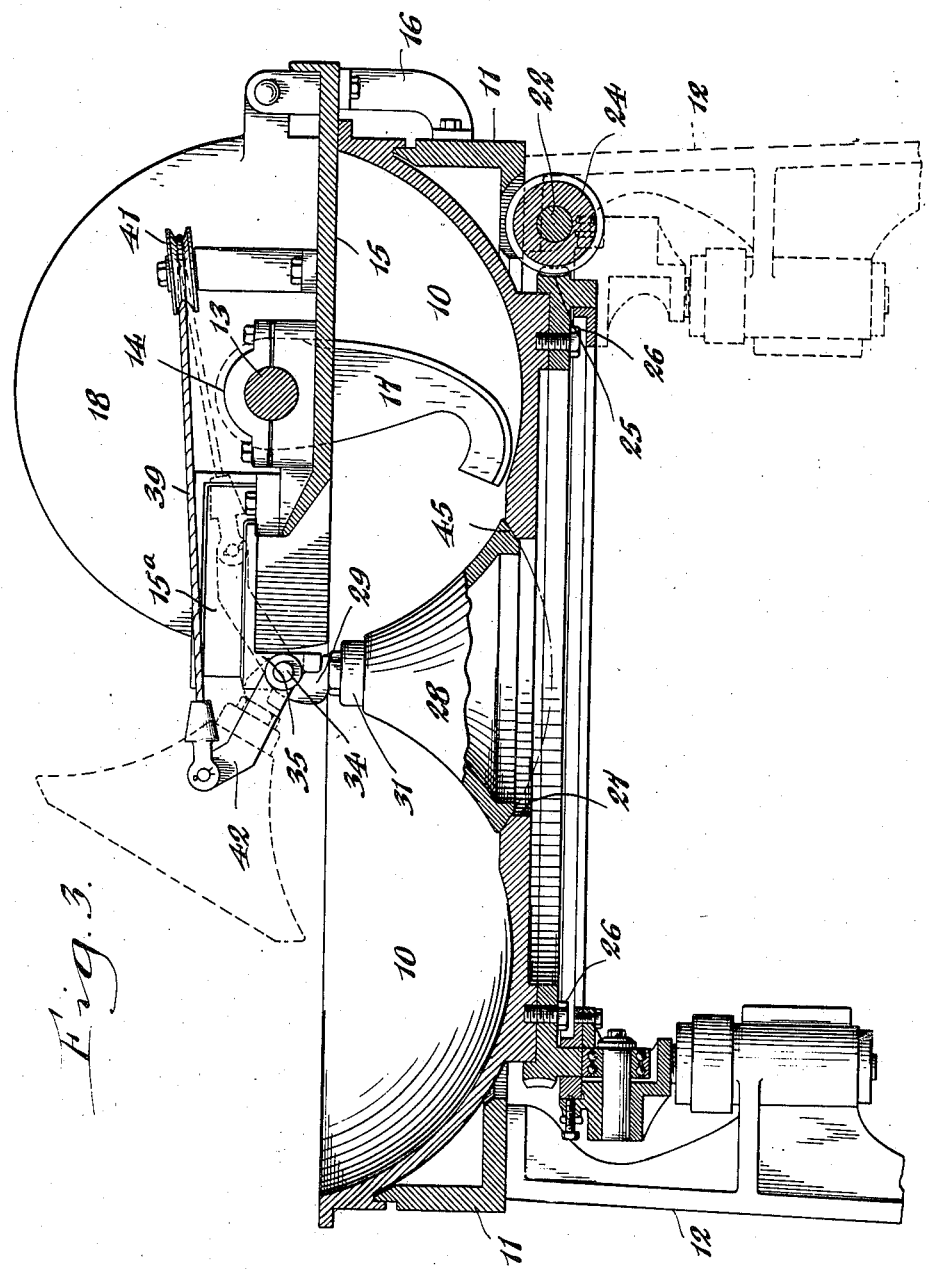

May 9, 1939.　　　A. C. VAN HOOYDONK　　　2,157,780
MEAT CUTTING MACHINE
Filed Sept. 11, 1937　　　3 Sheets-Sheet 3
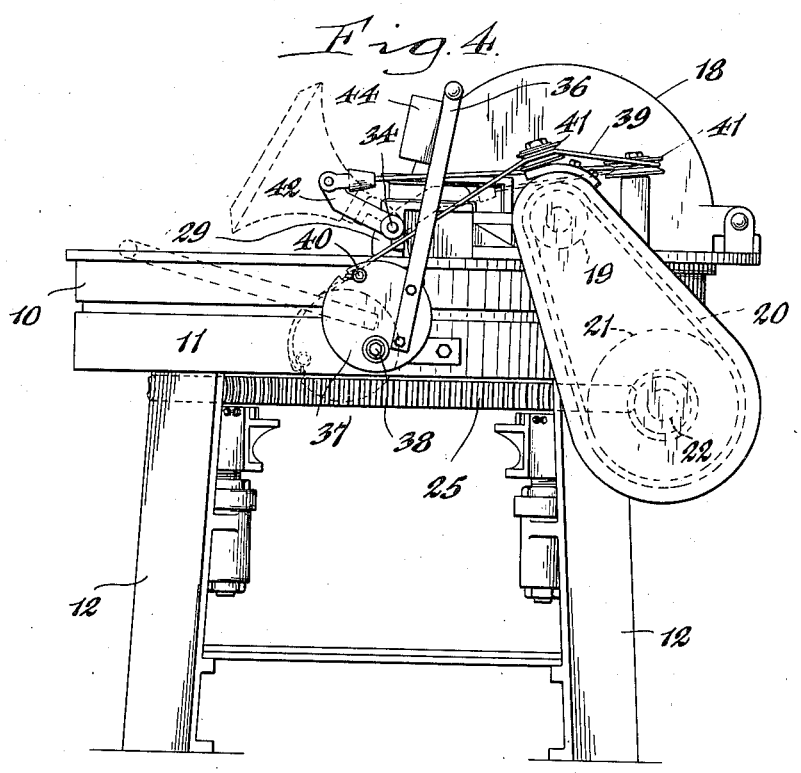
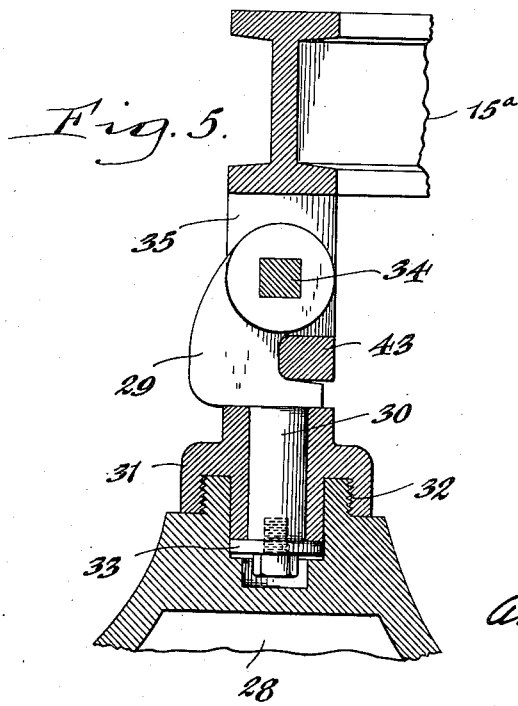
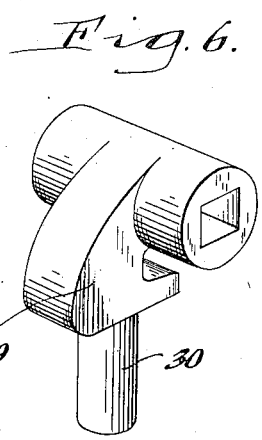
Inventor,
Adrian C. Van Hooydonk,
by Walter P. Geyer
Attorney.

Patented May 9, 1939

2,157,780

UNITED STATES PATENT OFFICE 2,157,780

MEAT CUTTING MACHINE

Adrian C. Van Hooydonk, Buffalo, N. Y., assignor to John E. Smith's Sons Company, Buffalo, N. Y., a corporation of New York Application September 11, 1937, Serial No. 163,417

9 Claims. (Cl. 146—67)

This invention relates generally to meat cutting machines embodying a rotary bowl, and more particularly to improvements in the means for effecting the removal or discharge of the contents from the bowl.

Its object is to provide a machine of this character with reliable and efficient means for discharging or emptying the cut or chopped contents of the bowl from the center thereof in a sanitary manner, and which means are so designed and constructed as to be easily and conveniently manipulated by the operator with a minimum of effort and with a maximum of safety.

Other features of the invention reside in the construction and arrangement of parts hereinafter described and particularly pointed out in the appended claims.

In the accompanying drawings:

Figure 1 is a front elevation of a meat cutting machine embodying my invention. Figure 2 is a top plan view thereof. Figure 3 is an enlarged cross section taken in the plane of line 3—3, Figure 2. Figure 4 is an end elevation showing the weighted lever for effecting the raising of the closure to discharge the meat from the bowl. Figure 5 is an enlarged fragmentary transverse vertical section taken on line 5—5, Figure 2. Figure 6 is a perspective view of the hanger member or coupling upon which the discharge plug or closure is mounted.

Similar characters of reference indicate corresponding parts throughout the several views.

In the preferred embodiment of the invention shown in the drawings, the same is shown in connection with a meat cutting machine of the rotary bowl type, 10 indicating the meat bowl which is of the trough or concavo-convex form supported at its periphery on a bed-ring 11 which is in turn mounted on suitable supports or legs 12. The numeral 13 indicates the drive shaft of the machine which may be driven by an electric motor and which is preferably disposed transversely over the meat bowl at one side of its axis and journaled in suitable bearings 14 applied to a cover plate 15 arranged over the rear portion of the bowl and supported by brackets 16 attached to the bed-ring 11, as seen in Figure 3. Mounted on this shaft and extending into the bowl 10 are a plurality of knives or cutters 17 which are adapted to revolve in the meat bowl during its rotation for cutting the meats or other foods. A suitable hinged hood or enclosure 18 is provided for enclosing the cutters.

The rotation of the meat bowl 10 is accomplished by the shaft 13 provided at one end with a pulley 19 connected by a belt 20 with a companion pulley 20 mounted on a parallel countershaft 22 disposed beneath the bowl and journaled in appropriate bearings 23 applied to the bed ring 11 or other part of the machine. Mounted on this counter-shaft is a worm 24 engaging a worm wheel 25 secured to the bottom side of the meat bowl by bolts 26.

Centrally of its bottom the bowl 10 is provided with a discharge opening 27 through which the chopped meat or other food is emptied or dumped into a suitable receptacle provided for receiving it. During the cutting operation of the machine the discharge opening is closed by a suitable plug or closure 28 of substantially conical shape so as to conform to the contour of and constitute a part of the trough-shaped bowl, as shown in Figure 3. This closure is suspended over the meat bowl for vertical-swinging movement into and out of its closed position, the construction being such that when the closure is swung to a position over the bowl there is sufficient room for quick discharge of the chopped meat and at the same time it will not in any way interfere with the scraping or dumping of the meat contents from the bowl. To this end, the closure 28 is preferably attached to or suspended from the lower end of a rockable hanger or coupler 29 having a shank or supporting stem 30 upon which the closure is adapted to swivel or revolve with the meat bowl independently of its supporting stem 30. The closure is detachably connected to the hanger-stem 30 by a coupling or bearing collar 31 applied to the stem and having an outer threaded connection 32 to the upper end of the closure, the inner portion of the collar abutting against a shoulder 33 formed at the lower end of the stem and preferably in the form of a washer bolted thereto, as shown in Figure 5.

The closure-hanger 29 is fixed to a square portion of a transverse horizontal actuating shaft 34 disposed above and in line with the axis of the discharge opening 27 and journaled at its ends in a bifurcated bearing member 35 applied to an extension 15a of the cover-plate 15, as shown in Figures 1 and 3. Any appropriate means may be employed for conveniently actuating the closure to swing about a horizontal axis, that shown in the drawings, by way of example, consisting of a hand lever 36 secured to a sheave 37 eccentrically fulcrumed at 38 to the bed-ring 11. A cable 39 is connected to the sheave as at 40, from which it passes around pulleys 41 in a reverse direction to a crank arm 42 mounted on the horizontal shaft 34 as shown in Figures 1 and 4. It will be noted from such figures that as the lever 36 is moved to its dotted line position shown in Figure 4 the closure 28 will be swung upwardly from its closed position away from the knives 17 to the dotted line open position shown more clearly in Figure 3. To insure the closure registering in its proper closed position with the discharge opening 27, a stop 43 is provided which may be formed integrally with the bifurcated bearing member 35 and against which the upper portion of the hanger-stem 30 is adapted to abut, as seen in Figure 5.

The closure or plug 28 is held in its closed position by gravity and in order to facilitate its opening and holding it in such open, dumping position, I preferably provide the hand lever 36 with a weight 44. It will be noted in Figure 3, that the lower marginal ring or end of the closure is convexly curved in coincidence with an arc described about the axis of the actuating rock shaft 34, and that the contacting seat 45 about the discharge opening 27 is concentric with that of such closure-end to insure a perfect seal between the closure and the bowl as well as a gliding movement of the closure to and from its closed position.

I claim as my invention:

1. In a food cutting machine, the combination of a rotary bowl having a central discharge opening for the food, and a pendant closure for such opening fulcrumed centrally over the bowl in axial relation to its discharge opening for vertically swinging movement into and out of its closed position.

2. In a food cutting machine, the combination of a rotary bowl having a discharge opening in its bottom disposed axially of its center of rotation, a pivot member disposed over the bowl at right angles to the bowl-axis and journaled in the axial plane of said discharge opening, and a pendant closure for said opening mounted on said pivot member for transverse swinging movement into and out of closed relation with such opening.

3. In a food cutting machine, the combination of a rotary bowl having a discharge opening in its bottom disposed axially of its center of rotation and including a displaceable closure member for such opening normally constituting an inherent part of the bowl to provide an annular trough-shaped receiver for the food, rotary cutters mounted at one side of the discharge opening and operating in the trough-shaped receiver, and a pivot member for said closure disposed axially over said discharge opening in substantially parallel relation with the cutter-axis for swinging the closure laterally into and out of engagement with such opening and through an arc intersecting that side of the bowl opposite to that containing said cutter.

4. In a food cutting machine, the combination of a rotary bowl having a discharge opening in its bottom disposed axially of its center of rotation, a vertically-swinging pendant hanger disposed over and normally extending into the bowl and pivoted on an axis at right angles to the bowl-axis and in the axial plane of said discharge opening, and a closure for said opening rotatably mounted on the lower end of said hanger for vertically swinging movement therewith through an arcuate path intersecting said bowl into and out of engagement with the bowl-opening and free to revolve with the bowl in its closed position.

5. In a food cutting machine, the combination of a rotary bowl having a discharge opening in its bottom disposed axially of its center of rotation, a vertically-swinging hanger disposed over and normally extending into the bowl and pivoted on an axis at right angles to the bowl-axis and in the axial plane of said discharge opening, a closure for said opening rotatably mounted on the lower end of said hanger for vertically swinging movement therewith transversely of said bowl into and out of engagement with the bowl-opening and free to revolve with the bowl in its closed position, and means for actuating said hanger to swing the closure into and out of its closed position.

6. In a food cutting machine, the combination of a rotary bowl having a discharge opening in its bottom disposed axially of its center of rotation, a vertically-swinging hanger disposed over and normally extending into the bowl and pivoted on an axis at right angles to the bowl-axis and in the axial plane of said discharge opening, a closure for said opening rotatably mounted on the lower end of said hanger for swinging movement therewith transversely of said bowl into and out of engagement with the bowl opening and free to revolve with the bowl in its closed position, and means for actuating said hanger to swing the closure into and out of its closed position, said means including a manual actuating member and a flexible connection between said member and the hanger-pivot, said actuating member having a counterweight thereon tending to hold the closure in its open position.

7. In a food cutting machine, the combination of a rotary bowl having a discharge opening in its bottom disposed axially of its center of rotation, a vertically-swinging hanger disposed over and normally extending into the bowl and pivoted on an axis at right angles to the bowl-axis and in the axial plane of said discharge opening, a closure for said opening rotatably mounted on the lower end of said hanger for swinging movement therewith transversely of said bowl into and out of engagement with the opening and free to revolve with the bowl in its closed position, and means for detachably connecting said closure to its hanger comprising a bearing collar applied to the hanger and held against axial displacement thereon and a detachable connection between the closure and said collar.

8. In a food cutting machine, the combination of a rotary bowl having a discharge opening in its bottom disposed axially of its center of rotation, a vertically-swinging hanger disposed over and normally extending into the bowl and pivoted on an axis at right angles to the bowl-axis and in the axial plane of said discharge opening, a closure for said opening rotatably mounted on the lower end of said hanger for swinging movement therewith transversely of said bowl into and out of engagement with the opening and free to revolve with the bowl in its closed position, and a stop for limiting the swinging of the hanger and its closure to closed position.

9. In a food cutting machine, the combination of a rotary bowl having a discharge opening in its bottom disposed over the bowl axially of its center of rotation, a pivot member disposed at right angles to the bowl-axis and journaled in the axial plane of said discharge opening, and a pendant closure for said opening mounted on said pivot member for transverse swinging movement into and out of closed relation with such opening, the latter having an arcuate seat described from the axis of said pivot member and said closure having its opposing contacting face curved to conform thereto.

ADRIAN C. VAN HOOYDONK.